H. BARROWS.
GAMBREL.
APPLICATION FILED MAR. 28, 1910.
959,287.
Patented May 24, 1910.
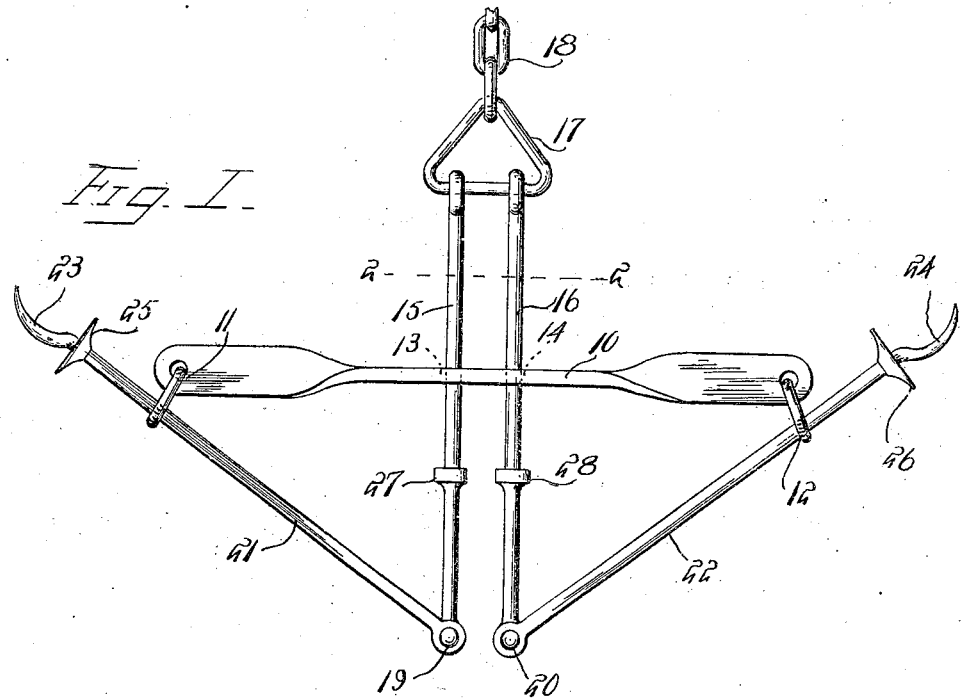
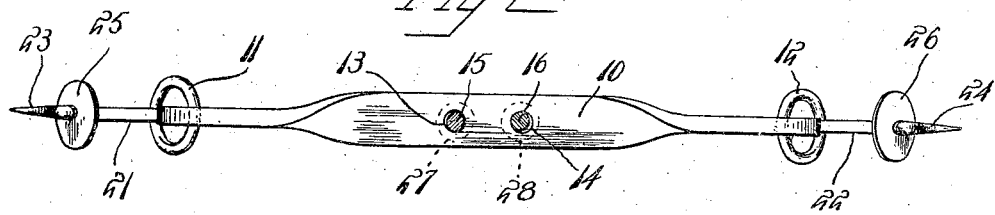
Witnesses
J. C. Singleton
C. N. Woodward
Inventor
Hiram Barrows.
By Chandlee & Chandlee
Attorneys

UNITED STATES PATENT OFFICE.

HIRAM BARROWS, OF HEBRON, ILLINOIS.

GAMBREL.

959,287.  Specification of Letters Patent.  Patented May 24, 1910.

Application filed March 28, 1910. Serial No. 551,879.

*To all whom it may concern:*

Be it known that I, HIRAM BARROWS, a citizen of the United States, residing at Hebron, in the county of McHenry, State of Illinois, have invented certain new and useful Improvements in Gambrels; and I do hereby declare the following to be a full, clear, and exact description of the invention, such as will enable others skilled in the art to which it appertains to make and use the same.

This invention relates to gambrels employed for suspending the carcasses of animals, and has for one of its objects to improve the construction and increase the strength, efficiency and utility of the same.

Another object of the invention is to provide a device of this character which will automatically adapt itself to the size of the carcass which is suspended.

With these and other objects in view, the invention consists in certain novel features of construction as hereinafter shown and described and then specifically pointed out in the claims; and, in the drawings illustrative of the preferred embodiment of the invention, Figure 1 is a side elevation of the improved device, Fig. 2 is a plan view of the same with the suspending rods in section on the line 2—2 of Fig. 1.

The improved device comprises a main supporting bar 10, which may be of any required material or size, but is preferably formed of metal, and is shown constructed of a flat bar with the central portion arranged flatwise and the terminals twisted one-fourth around, and provided at the ends with combined guides and supporting rings 11—12. Formed through the central flatwise portion of the bar are two relatively large apertures 13—14 through which two relatively heavy rods 15—16 are slidably disposed as shown and provided at their upper ends with a lifting ring 17 to which a chain or other supporting member 18 may be connected.

Pivoted at 19—20 to the lower ends of the rods 15—16 are main spreader members 21—22, the spreader members extending through the rings 11—12, as shown. The free ends of the members 21—22 are formed into curved spurs 23—24 to engage in the "gambrel" portions of the hind legs of the slaughtered animal and are likewise provided with suitable plates 25—26, to limit the distance which the spurs 23—24 shall enter into the carcass. By this means the carcasses are prevented from injury when the device is applied. The rods 15—16 are likewise provided with suitable stops 27—28 between the pivots 19—20 and the bar 10, to limit the upward movement of the members 15—16.

The improved device is preferably constructed wholly of metal, and of suitable strength to withstand the strains to which the parts will be subjected.

In applying the improved device the rods 15—16 are relaxed to move the spurs 23—24 to their innermost positions. The spurs are then inserted into the gambrels of the slaughtered animal and strain applied to the hoisting member 18 to elevate the improved device and the animal connected thereto. This upward movement of the device causes the bars 15—16 to apply strain to the spreader members 21—22 and correspondingly spread the hind legs of the animal apart, and thus dispose the animal in position for further dressing and butchering operations.

The improved device thus automatically adapts itself to the size of the animal and is equally applicable to the smallest or the largest animals. The stops 27—28 prevent the spreader members 21—22 from passing above the center line and thus becoming locked in position.

What is claimed is:—

1. In a gambrel, a horizontal bar having guides at the ends, spreader members slidable through said guides, rods extending through said bar and pivotally connected to said spreader members, and elevating means applied to said rods.

2. In a gambrel, a horizontal bar having guides at the ends, spreader members slidable through said guides and formed with terminal spurs, stops upon said spreaders near said spurs, rods extending through said bar and pivotally connected to said spreader members, and elevating means applied to said rods.

3. In a gambrel, a horizontal bar having guides at the ends, spreader members slidable through said guides, rods extending through said bar and pivotally connected to said spreader members, stops upon rods to limit their upward movement, and elevating means applied to said rods.

4. In a gambrel, a horizontal bar, rings swinging in said bar at the ends, spreader members slidable through said rings, rods extending through said bar and pivotally connected to said spreader members, and elevating means applied to said rods.

In testimony whereof, I affix my signature, in presence of two witnesses.

HIRAM BARROWS.

Witnesses:
WINIFRED B. URIE,
E. A. MEAD.